(12) United States Patent
Dusad et al.

(10) Patent No.: US 9,881,145 B2
(45) Date of Patent: Jan. 30, 2018

(54) ADDING FEATURES AND SERVICES WITHOUT PASSWORD EXPOSURE

(71) Applicant: Avaya Inc., Santa Clara, CA (US)

(72) Inventors: Manish Dusad, Pune (IE); Ping Lin, Belleville (CA); Gordon Brunson, Broomfield, CO (US); Mark Mackenzie, McKinney, TX (US); Navjot Singh, Somerset, NJ (US); Geoff Baskwill, Almonte (CA)

(73) Assignee: Avaya Inc., Santa Clara, CA (US)

( * ) Notice: Subject to any disclaimer, the term of this patent is extended or adjusted under 35 U.S.C. 154(b) by 73 days.

(21) Appl. No.: 14/955,225

(22) Filed: Dec. 1, 2015

(65) Prior Publication Data

US 2016/0314286 A1    Oct. 27, 2016

Related U.S. Application Data

(60) Provisional application No. 62/151,112, filed on Apr. 22, 2015.

(51) Int. Cl.
| | |
|---|---|
| *H04L 29/06* | (2006.01) |
| *G06F 21/12* | (2013.01) |
| *H04W 12/06* | (2009.01) |

(52) U.S. Cl.
CPC .......... *G06F 21/121* (2013.01); *H04L 63/08* (2013.01); *H04L 63/083* (2013.01); *H04W 12/06* (2013.01); *G06F 2221/2141* (2013.01)

(58) Field of Classification Search
CPC .......... G06F 21/31; G06F 21/32; G06F 21/45; G06F 21/62; G06F 21/121; G06F 2221/2141; H04L 63/08; H04L 63/083; H04W 12/06; H04W 12/08

USPC .............................. 726/2–7, 27–30; 713/182
See application file for complete search history.

(56) References Cited

U.S. PATENT DOCUMENTS

| | | | |
|---|---|---|---|
| 7,921,289 B2* | 4/2011 | Teijido ................ | H04L 63/0209 380/286 |
| 7,950,065 B2* | 5/2011 | Toutonghi ............... | G06F 21/10 713/168 |
| 8,136,143 B2* | 3/2012 | Hannel ............... | H04L 63/0218 370/252 |
| 8,260,862 B2* | 9/2012 | Chatterjee ............. | H04L 9/3271 379/93.04 |
| 8,463,710 B2* | 6/2013 | Hoffman ................ | C07K 14/53 340/5.52 |
| 8,543,806 B2* | 9/2013 | Peckover ............ | G06F 21/6245 713/151 |

(Continued)

*Primary Examiner* — Hosuk Song
(74) *Attorney, Agent, or Firm* — Sheridan Ross P.C.

(57) ABSTRACT

An indication of a change in a right to use a service or feature is received. For example, this can be based on an administrator granting access to a previously installed service or feature. In response, a notification is sent to a user of the change of the right to use the service or feature. The notification requests the user to provide a credential to approve the change of the right to use the service or feature. For example, a link may be provided in an email or text message that the user can click on to provide a password/user name. The credential is received and verified. In response to validating the credential, access is allowed according to the change of the right to use the service or feature. The user then has access to the service/feature without the administrator having to know the user's credential.

20 Claims, 3 Drawing Sheets

(56) References Cited

U.S. PATENT DOCUMENTS

| | | | |
|---|---|---|---|
| 8,543,827 B2 * | 9/2013 | Garcia | G06F 21/6209 713/166 |
| 8,606,075 B2 | 12/2013 | Ohshima | |
| 2011/0162053 A1 | 6/2011 | Pei et al. | |
| 2013/0086658 A1 | 4/2013 | Kottahachchi et al. | |

\* cited by examiner

ADDING FEATURES AND SERVICES WITHOUT PASSWORD EXPOSURE

CROSS REFERENCE TO RELATED APPLICATIONS

This application claims the benefit under 35 U.S.C. § 119(e) of U.S. Provisional Application No. 62/151,112, filed Apr. 22, 2015, entitled "ADDING FEATURES AND SERVICES WITHOUT PASSWORD EXPOSURE," the entire disclosure of which is incorporated herein by reference.

TECHNICAL FIELD

The systems and methods disclosed herein relate to authentication systems or computer applications.

BACKGROUND

In today's computer systems, there may be services/features that are provided by the same vendor or different vendor(s) that are managed through the same management system. For example, a communication system may provide a variety of communication services, such as voice, video, email, Instant Messaging, and the like. Some or all of these services may be provided by different stand-alone systems provided each authenticating uses based on the user's passwords. If an administrator wants to enable features for the different services/features for an end user, because the users manage their own passwords and credentials, the administrator would need to know the end user's password or have access to the user's credentials in order to administer rights for the user. This poses a security issues because the user's password/credentials are exposed to the administrator. If the administrator leaves the company, the administrator now becomes a security risk because of the exposure to the user's password/credentials.

BRIEF SUMMARY

Systems and methods are provided to solve these and other problems and disadvantages of the prior art. An indication of a change in a right to use a service or feature is received. For example, this can be based on an administrator granting access to a previously installed service or feature. In response, a notification is sent to a user of the change of the right to use the service or feature. The notification requests the user to provide a credential to approve the change of the right to use the service or feature. For example, a link may be provided in an email or text message that the user can click on to provide a password/user name. The credential is received and verified. In response to validating the credential, access is allowed according to the change of the right to use the service or feature. The user then has access to the service/feature without the administrator having to know the user's credentials.

DETAILED DESCRIPTION

Figure 1:
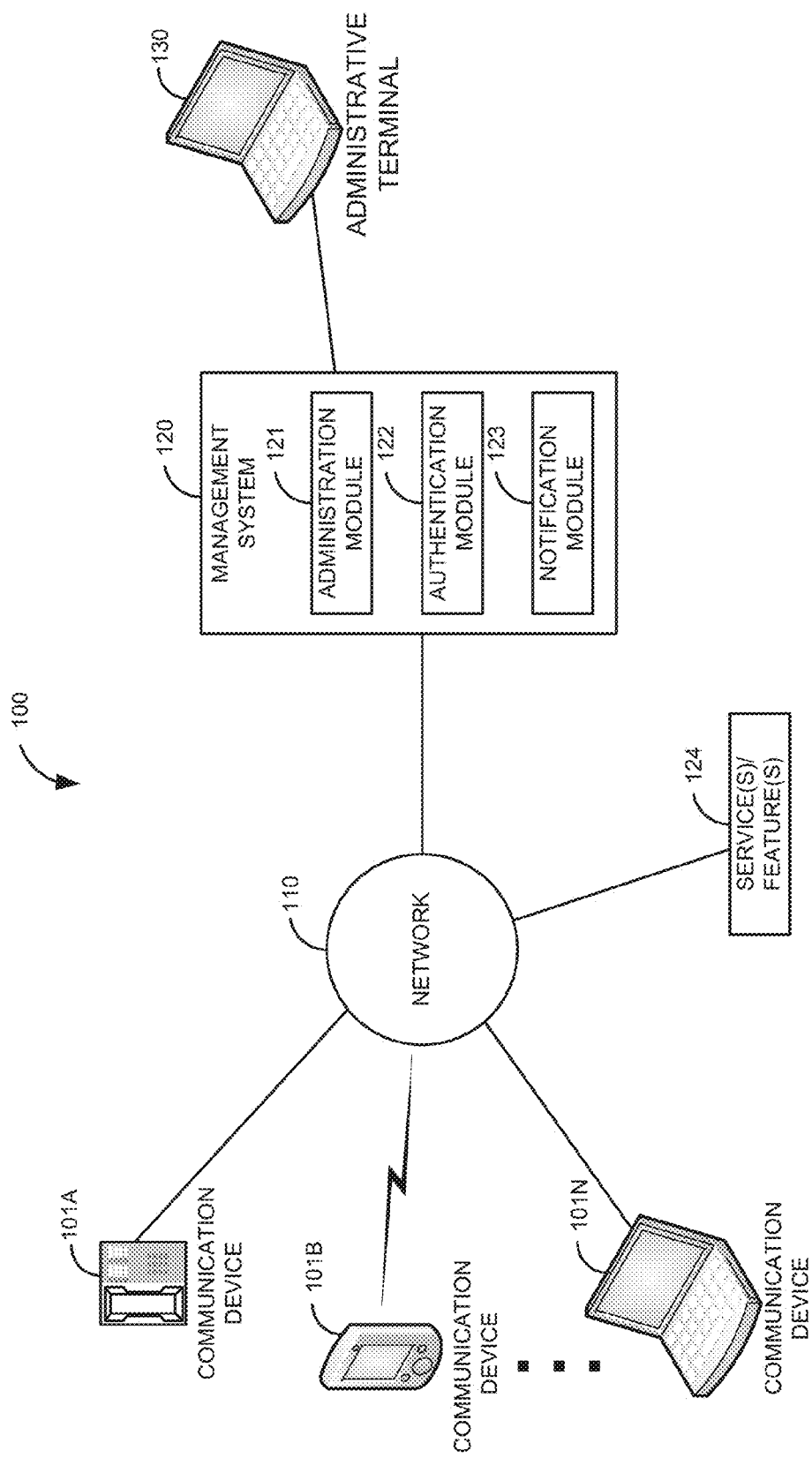
FIG. 1 is a block diagram of a first illustrative system for credential management.

FIG. 1 is a block diagram of a first illustrative system 100 for credential management. The first illustrative system 100 comprises communication devices 101A-101N, a network 110, a management system 120, services/features 124, and an administration terminal 130.

The communication device 101 can be or may include any device that can communicate on the network 110, such as a Personal Computer (PC), a telephone, a video system, a cellular telephone, a Personal Digital Assistant (PDA), a tablet device, a notebook device, a smart phone, and the like. As shown in FIG. 1, any number of communication devices 101A-101N may be connected to the network 110, including only a single communication device 101. In addition, the communication device 101 may be directly connected to the services/features 124 and/or management system 120.

The network 110 can be or may include any collection of communication equipment that can send and receive electronic communications, such as the Internet, a Wide Area Network (WAN), a Local Area Network (LAN), a Voice over IP Network (VoIP), the Public Switched Telephone Network (PSTN), a packet switched network, a circuit switched network, a cellular network, a combination of these, and the like. The network 110 can use a variety of electronic protocols, such as Ethernet, Internet Protocol (IP), Session Initiation Protocol (SIP), Integrated Services Digital Network (ISDN), email protocols, text messaging protocols, video protocols, and/or the like. Thus, the network 110 is an electronic communication network configured to carry messages via packets and/or circuit switched communications.

The management system 120 may be any hardware device, coupled with software that can provide management services for the services/features 124, such as, a Private Branch Exchange (PBX), a communication manager, session manager, a central office switch, a proxy server, a file server, a web server, and/or the like. The management system 120 further comprises and administration module 121, an authentication module 122, and a notification module 123.

The administration module 121 can be or may include any hardware/software that can provide administration services for the management system 120 and/or the services/features 124. The administration module 121 may be used to administer multiple services/features that are running on multiple threads or processor cores. In FIG. 1, the administration module 121 is shown as part of the management system 120. In some embodiments, the administration module 121 may be separate from the management system 120. Alternatively, the administration module 121 may be distributed between the management system 120 and other network elements.

The authentication module 122 can be or may include any hardware/software that can provide authentication services for the management system 120 and/or the services/features 124. The authentication module 122 can use various types of protocols to provide security, such as encryption, digital certificates, passwords, user names, hashing, and/or the like. In some embodiments, the authentication module 122 may be separate from the management system 120. For example, the authentication module 122 may be a separate trust authority on a separate server. Alternatively, the authentication module 122 may be distributed between the management system 120 and other network elements.

The notification module 123 can be or may include any hardware/software that can provide a notification to a user, such as, an email system, a text messaging system, an auto-dialer system, an Instant Messaging (IM) system, a video messaging system, and/or the like. In some embodiments, the notification module 123 may be separate from the management system 120. Alternatively, the notification module 123 may be distributed between the management system 120 and other network elements.

The services/features 124 can be or may include any software that can provide services/features 124 to users of the communication devices 101. For example, a service 124 can be a communication application, a recording application, a conferencing application, a web server application, a document management application, a collaboration application, a database application, a call translation application, a voice to text application, an email application, a video application, a voice mail application, a network management system, a web application, and/or the like. As used herein, the terms service and application are used interchangeably. The services/features 124 can be from the same vendor or from multiple vendors. The services/features 124 can be running on multiple threads or processor cores. The services/features 124 are shown separate from the management system 120. For example, the services/features 124 may be provided by different vendors on different servers. However, in some embodiments, the services/features 124 may be part of the management system 120. For example, where the features/services 124 are provided by a single vendor.

A feature 124 can be a individual feature of a service, such as an administrated function of a service, a moderator function of a conferencing application, a call blocking feature of a management system 120, a caller ID feature of a management system 120, a call forwarding feature of a management system 120, a write capability of a document management system, a view capability for a document management system, and/or the like. In FIG. 1, the services/features 124 may comprise one or more services. In addition, the one or more services may also have zero or more features. A feature of a service may also run on a thread or processor core that is separate from a thread of the service.

The administrative terminal 130 can be or may include any device that can be used to administer the management system 120. For example, the administrative terminal 130 may be the communication device 101. In FIG. 1, the administrative terminal 130 is shown directly connected to the management system 120. However, in some embodiments the administrative terminal 130 may be connected to the management system 120 via the network 110 or via a second network 110.

Figure 2:
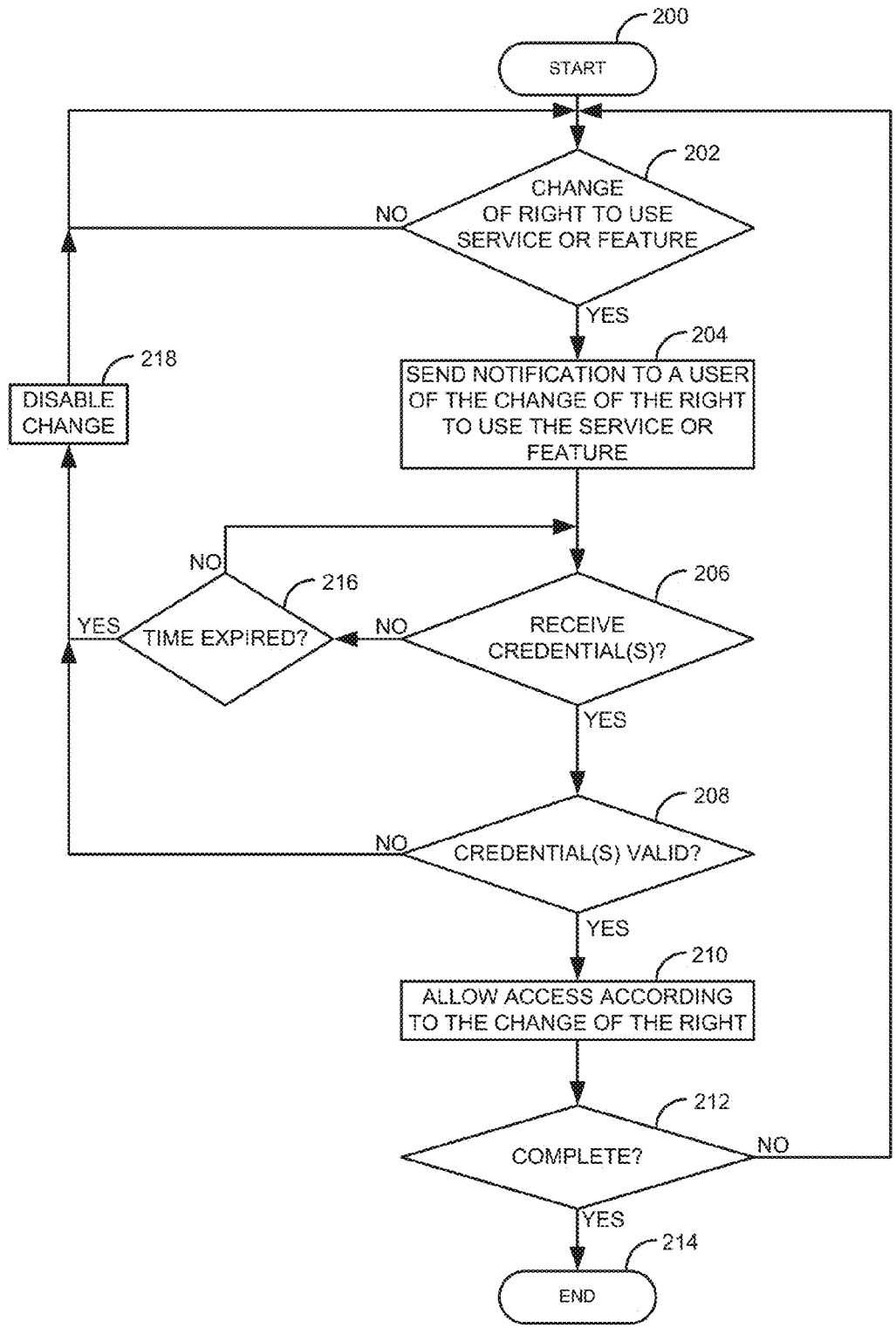
FIG. 2 is a flow diagram of a first process for credential management.
Figure 3:
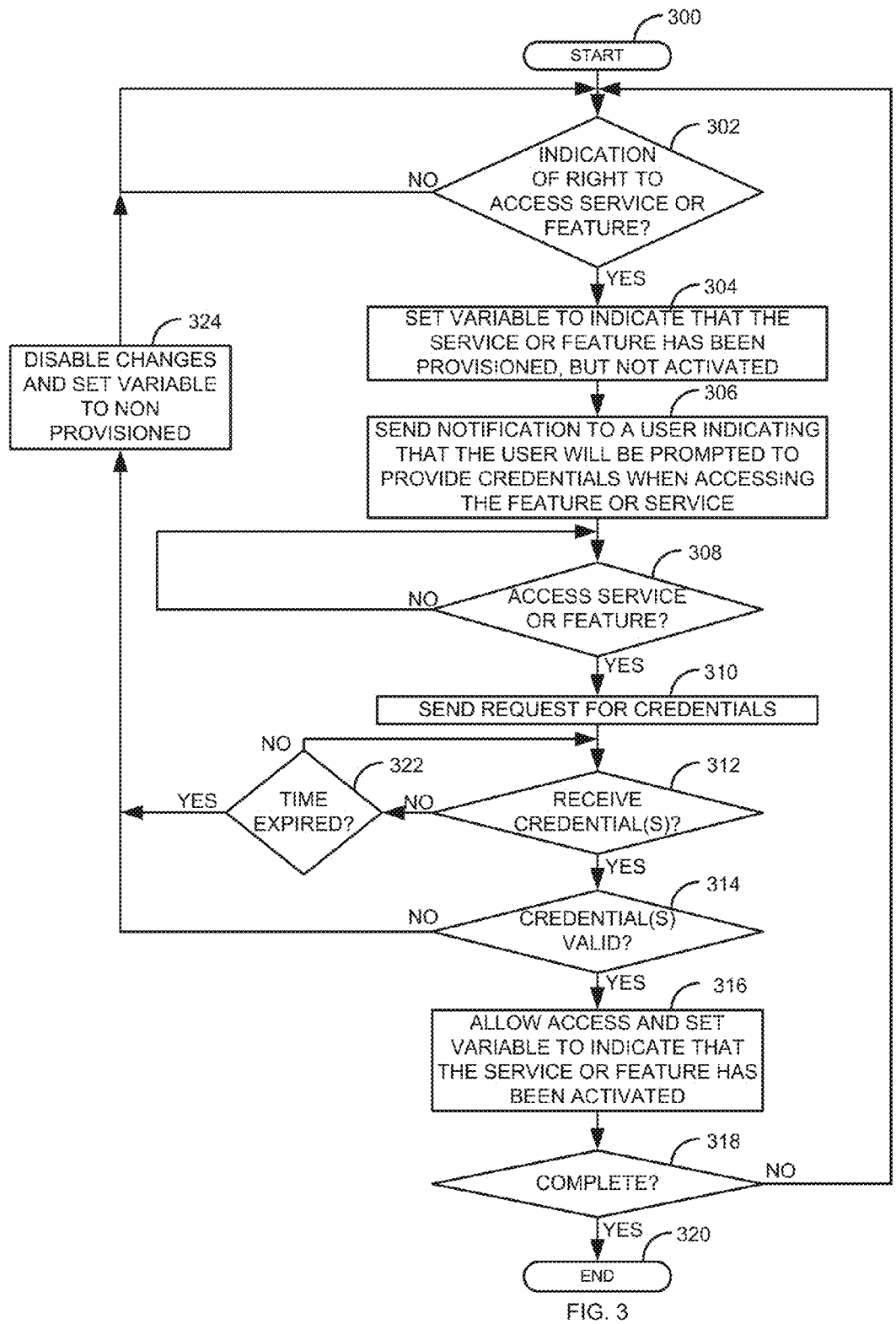
FIG. 3 is a flow diagram of a second process for credential management.

FIG. 2 is a flow diagram of a first process for credential management. Illustratively, the communication devices 101A-101N, the management system 120, the administration module 121, the authentication module 122, the notification module 123, the services/features 124, and the administrative terminal 130 are stored-program-controlled entities, such as a computer or processor coupled with a memory, which performs the method of FIGS. 2-3 and the processes described herein by executing program instructions stored in a computer readable storage medium, such as a memory or disk. Although the methods described in FIGS. 2-3 are shown in a specific order, one of skill in the art would recognize that the steps in FIGS. 2-3 may be implemented in different orders and/or be implemented in a multi-threaded environment. Moreover, various steps may be omitted or added based on implementation.

The process starts in step 200. In step 202, the administration module 121 waits to receive an indication of a change of a right to use a service or feature 124. If an indication of a change of the right to use a service or feature 124 is not received in step 202, the process waits in step 202 to receive the indication of a change of the right to use a service or feature 123. A change of a right to use a service or feature 124 can be any change in an access right, such as allowing access to the service or feature 124, denying access to the service or feature 124, providing limited access to the service or feature 124. For example, an administrator at the administrative terminal 130 may grant an access right for a user to access a call record service (a service 124). Alternatively, the administrator may grant a read only right to a document controlled by a document management service (a feature of the document management service).

When an indication of the change of the right to use a service or feature 124 is received in step 202, the notification module 123 sends, in step 204, a notification to the user that indicates the change of the right to use the service or feature 124. The notification also instructs the user of where the user can provide one or more credentials to approve the change of the right to use the service or feature 124. The credential(s) may be a global credential (e.g., a single sign on password), a service specific credential, a one-time password, a feature specific credential, and/or the like.

The process of step 204 can be accomplished in various ways. For example, if the right is access a recording service 124, the notification can be an email or text message that has a link that the user can click on access the recording service 124. When the user clicks on the link, the user will be asked to provide one or more credentials to gain access to the recording service 124. The user may be asked to provide a user name/password or a digital certificate. In one embodiment, the email or text message may include an auto-generated one-time password that the user provides when clicking on the link. The user may also be given opportunity to reject the change. For example, the notification may contain a button or link to reject the change in right. The rejection may require that the user provide the credential(s).

In other embodiments, other types of communication modalities may be used for the notification, such as an auto-dialer that calls the user. The user can then enter a PIN number to accept the change of the right or optionally may reject the change based on entering a specific number. Other modalities can be used, such as video, Instant Messaging, and the like may be used.

In another embodiment, the notification of step 204 may indicate that the change of the right is to multiple services and/or features 124. For example, the notification of step 204 may indicate that the user now has the right to access the recording service and also has been granted read access to a document in a database. The user may be able to accept/reject each of the changes in rights individually or as a group. The notification may indicate that rights to multiple features of a service have been granted. The user may be able to accept/reject each of the changes in rights to the features of the service individually or as a group.

Although not shown in FIG. 2, the administration module 121 may keep track of the state of the change or right. For example, after step 202, the administration module 121 may set a variable to indicate that the feature has been provisioned, but not yet activated (if the right was to grant access to the feature or service 124). This way, an administrator can know the current state of the change by viewing the variable.

The authentication module 122 waits to receive the credential(s) in step 206. For example, if the user clicks on the link, the user can provide the credential(s) at a web page pointed to by the link. If the credential(s) are not received in step 206, the process goes to step 216 to see if a time has expired. For example, the user may be given 24 hours to respond to the email or text message by clicking on the link and entering the credential(s). If the timer has expired in step 216, the process goes to step 218 where the changes are disabled and the process goes back to step 202. The state of the variable may also change back to the previous value. If the timer has not expired in step 216, the authentication module 122 waits to receive the credential(s) in step 206.

If the credential(s) are received in step 206, the authentication module 122 determines in step 208 if the credentials are valid. For example, one way to validate the credentials is to store a one-way hash of the password with salt for each user/service. At the time of validation, the user is asked to provide the credential. The system generates a one-way hash using the user provided credential and the salt. The stored one-way hash is compared against the generated value. If they match then the credentials are valid. If the credential(s) are not valid in step 208, the process goes to step 218 where the changes are disabled and the process goes back to step 202. The process of step 208 may allow for several attempts before going to step 218.

If the credential(s) are validated in step 208, the authentication module 122 allows access according to the change of the right in step 210. For example, during the validation process, the user provided password is temporarily stored in memory. If the password validation is successful, the system uses the password to activate the service. The password is then deleted from memory. In addition, the variable can be set to indicate that the service or feature 124 accepted in step 210 has been accepted by the user. For example, the variable may be set to indicate that the service or feature 124 has been activated.

The administration module 121 determines in step 212 if the process is complete. If the process is not complete in step 212, the process goes to step 202. Otherwise, if the process is complete in step 212, the process ends in step 214.

In one embodiment, where the services/features 124 are located on the same system, the services/features 124 may be different threads that are running on a multi-tasking operating system. In this embodiment, the authentication process of FIG. 2 is performed between multiple threads. For example, an administrator may be able to administer multiple services/features 124 running on multiple separate threads at the same time from the administration module 121. When the user provides the credential, the credential allows access by the user to multiple services/features 124 that are running on multiple separate threads on the multi-tasking operating system. The process described above will also run on a multi-core processor where the services/features 124 are running on separate cores of the multi-core processor.

FIG. 3 is a flow diagram of a second process for credential management. The process starts in step 300. In step 302, the administration module 121 waits to receive an indication of a right to access a service or feature 124. If an indication of the right to use the service or feature 124 is not received in step 302, the process waits in step 302 to receive the indication of the right to use the service or feature 124.

When an indication of the right to use the service or feature 124 is received in step 302, the administration module 121 may optionally set a variable to indicate that the service or feature 124 has been provisioned, but not yet activated in step 304.

The notification module 123 sends a notification to the user that indicates the right to use the service or feature in step 306. The notification also indicates that the user will be prompted to provide one or more credentials (e.g., a login name and password) when the user next accesses the service or feature 124. The notification of step 306 may be sent in a variety of communication modalities, such as email, text messaging, voice mail, Instant Messaging, video messaging, and/or the like. The notification may also indicate that the user can reject the right to access the service or feature 124. For example, they can click on a link to reject the right to access the service or feature 124. The rejection may require that the user provide the credential(s).

In one embodiment, the notification may indicate that the user has the right to access a plurality of features of a service. If the notification covers different services, the notification can indicate that the user will have to provide the credential (or different credentials) when accessing the different services. Alternatively if the right to access is to access multiple features of a service, the notification may tell the user that the user will have to provide the credential only once when accessing a first feature. Alternatively, the notification may tell the user that the user will have to provide the credential each time the user accesses a feature or service 124.

The authentication 122 module waits in step 308 for the user to access the service or feature 124. If the user does not access the service or feature 124 in step 308, the process repeats step 308. Otherwise, if the user accesses the service or feature in step 308, the authentication module 122 sends a request to the user to provide the credential(s) in step 310. The request can be made in various ways, such as providing a pop-up window where the user can enter the credential(s) (e.g., a global user name and password).

The authentication module 122 waits to receive the credential(s) in step 312. If the credential(s) are not received in step 312, the process goes to step 322 to see if a time has expired. For example, the user may be given 2 minutes to provide the credential(s). If the timer has expired in step 322, the process goes to step 324 where the changes are disabled and the variable is set to non-provisioned. The process then goes back to step 302. Otherwise, if the timer has not expired in step 322, the authentication module 122 waits to receive the credential(s) in step 312.

If the credential(s) are received in step 312, the authentication module 122 determines in step 314 if the credentials are valid. If the credential(s) are not valid in step 314, the process goes to step 324 where the changes are disabled and the variable is set to non-provisioned. The process of step 314 may allow for several attempts before going to step 324. The process then goes to step 302.

Otherwise, if the credentials are validated in step 314, the authentication module 122 allows access to the service or feature and sets the variable to indicate that the service or feature has been activated in step 316. The credential(s) may be a global credential (e.g., a single sign on password), a service specific credential, a one-time password, a feature specific credential, and/or the like.

The administration module 121 determines in step 318 if the process is complete. If the process is not complete in step 318, the process goes to step 302. Otherwise, if the process is complete in step 318, the process ends in step 320.

In one embodiment, the service or feature is enabled by the administrator, but is not yet fully operational because the user has not yet been involved. For example, the user has not been notified or has ignored the message. When the user attempts to access the newly-enabled feature or service, the user is challenged for their credentials. Upon successful entry of the user name and password, the user can access the feature or service.

In one embodiment, where the services/features 124 are located on the same system, the services/features 124 are different threads that are running on a multi-tasking operating system. In this embodiment, the authentication process of FIG. 2 is performed between multiple threads. For example, an administrator may be able to administer rights for multiple services/features 124 running on multiple separate threads at the same time from the administration module 121. When a user accesses the first service/feature 124 on a first thread, the user is asked to provide a global credential (or a local credential) to activate the use of the first service on the first thread. When the user accesses the second service on a second thread, the user also provides the global credential (or a different local credential). The process described above will also run on a multi-core processor where the services/features 124 are running on separate cores of the multi-core processor.

In one embodiment, the processes described in FIGS. 1-3 can be implemented where the authentication system in a trust authority (e.g., provided by a third party) that provides authentication services for the multiple services/features provided by different vendors. The trust authority provides a single sign on service for each of the services/features 124. The trust authority provides the verification of the credentials in step 208 and 314. The verification of the credentials is provided to the management system 120 in order for the management system 120 to allow access/set rights for each of the services/features 124. In this example, the credentials are redirected to the trust authority for verification.

Of course, various changes and modifications to the illustrative embodiments described above will be apparent to those skilled in the art. These changes and modifications can be made without departing from the spirit and the scope of the system and method. The following claims specify the scope of the disclosure. Those skilled in the art will appreciate that the features described above can be combined in various ways to form multiple variations of the disclosure. As a result, the disclosure is not limited to the specific embodiments described above, but only by the following claims and their equivalents.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C," and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated that individual aspects of the disclosure can be separately claimed. As will be appreciated by one skilled in the art, aspects of the present disclosure may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

What is claimed is:

1. A system comprising:
a memory,
a processor in communication with the memory, the processor that executes software modules, the software modules comprising:
an administration module that receives an indication of a change of a right to use a service or feature and sets a variable to indicate that the service or feature has been provisioned, but not yet activated in response to receiving the indication of the change of the right to use the service or feature, wherein the indication of the change of the right to use the service or feature is a right to access the service or feature;
a notification module that sends a notification, to a user, of the change of the right to use the service or feature in response to receiving the indication of the change of the right to use the service or feature, wherein the notification notifies the user to provide a credential to approve the change of the right to use the service or feature; and
an authentication module that receives the credential, validates the credential, and allows access according to the change of the right to use the service or feature in response to receiving the credential.

2. The system of claim 1, wherein the notification is an email or text message with a link that includes an option to activate the service or feature.

3. The system of claim 2, wherein the email or text message comprises an auto-generated one-time password that the user has to provide after clicking on the link.

4. The system of claim 1, wherein the administration module sets the variable to indicate that the service or feature has been activated in response to receiving the credential.

5. The system of claim 1, wherein the notification comprises an option to not accept the access to the service or feature.

6. The system of claim 1, wherein the indication of the change of the right to use the service or feature, is a right to no longer access the feature.

7. The system of claim 1, wherein the service or feature comprises a plurality of services and/or features and wherein the notification notifies the user that the user is to provide the credential to approve the right to use the plurality of services and/or features.

8. The method of claim 1, wherein the service or feature comprises a plurality services and/or features and wherein the plurality of services and/or features run on a plurality of separate threads.

9. A method comprising:
receiving, by a processor, an indication of a change of a right to use a service or feature;
in response to receiving the indication of the change of the right to use the service or feature, setting, by the processor, a variable to indicate that the service or feature has been provisioned, but not yet activated, wherein the indication of the change of the right to use the service or feature is a right to access the service or feature;
in response to receiving the indication of the change of the right to use the service or feature, sending, by the processor, a notification, to a user, of the change of the right to use the service or feature, wherein the notification notifies the user to provide a credential to approve the change of the right to use the service or feature;
receiving, by the processor, the credential;
validating, by the processor, the credential; and
in response to validating the credential, allowing, by the processor, access according to the change of the right to use the service or feature.

10. The method of claim 9, wherein the notification is an email or text message with a link that includes an option to activate the service or feature.

11. The method of claim 10, wherein the email or text message comprises an auto-generated one-time password that the user has to provide after clicking on the link.

12. The method of claim 9, further comprising: in response to receiving the credential, setting the variable to indicate that the service or feature has been activated.

13. The method of claim 9, wherein the notification comprises an option to not accept the access to the service or feature.

14. The method of claim 9, wherein the indication of the change of the right to use the service or feature, is a right to no longer access the feature.

15. The method of claim 9, wherein the service or feature comprises a plurality of services and/or features and wherein the notification notifies the user that the user is to provide the credential to approve the right to use the plurality of services and/or features.

16. A method comprising:
receiving, by a processor, an indication of a right to access a service or feature;
in response to receiving the indication of the right to access the service or feature, setting, by the processor, a variable to indicate that the service or feature has been provisioned, but not yet activated;
in response to receiving the indication of the right to access the service or feature, sending, by the processor, a notification to a user indicating that when the user tries to access the service or feature the user will be prompted for a credential;
determining, by the processor, that the user is trying to access the service or feature;
in response to determining that the user is trying to access the service or feature, sending a prompt to the user for the credential;
receiving, by the processor, the credential; and
in response to receiving the credential, allowing, by the processor, access to the service or feature.

17. The method of claim 16, wherein service or feature comprises a service with a plurality of features and wherein the notification notifies the user that the user will have provide the credential when accessing each of the plurality of features of the service.

18. The method of claim 16, wherein the notification comprises an option to not accept the access to the service or feature.

19. The method of claim 16, further comprising: in response to receiving the credential, setting the variable to indicate that the feature or service has been activated.

20. The method of claim 16, wherein the service or feature comprises a plurality services and/or features and wherein the plurality of services and/or features run on a plurality of separate threads.

* * * * *